(12) United States Patent
Fan (10) Patent No.: US 6,771,838 B1
(45) Date of Patent: Aug. 3, 2004

(54) SYSTEM AND METHOD FOR ENHANCING DOCUMENT IMAGES

(75) Inventor: Jian Fan, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 673 days.

(21) Appl. No.: 09/684,312

(22) Filed: Oct. 6, 2000

(51) Int. Cl.$^7$ .............................................. G06K 9/40
(52) U.S. Cl. ...................... 382/274; 382/167; 382/266; 382/199; 358/519
(58) Field of Search ................................ 382/274, 168, 382/254, 199, 266, 167; 358/462, 519; 345/77

(56) References Cited

U.S. PATENT DOCUMENTS

| | | | |
|---|---|---|---|
| 5,414,538 A | 5/1995 | Eschbach | 358/522 |
| 6,115,022 A | * 9/2000 | Mayer et al. | 345/418 |
| 6,462,768 B1 | * 10/2002 | Oakley | 348/31 |
| 2002/0025079 A1 | * 2/2002 | Kuwata et al. | 382/254 |

OTHER PUBLICATIONS

Rafael C. Gonzalez and Paul Wintz, Digital Image Processing, second edition, Addison–Weslye Publishing Company, Reading, Massachusetts, 1987, pp. 183–186.

Mohamed Kamel and Aiguo Zhao, "Extraction of Binary Character/Graphics Images from Grayscale Document Images", CVGIP, vol. 55, No. 3, 1993, pp. 203–217.

William H. Press, Saul A. Teukolsky, William T. Vettering and Brian P. Flannery, Numerical Recipes in C, second edition, Cambridge University Press, New York, 1992, pp. 123–124.

* cited by examiner

*Primary Examiner*—Bhavesh M. Mehta
*Assistant Examiner*—John Strege (57) ABSTRACT

A system and method for enhancing digital images containing both text and pictorial content ("mixed document images") utilizes an estimated illumination surface for a given digital image to correct the undesirable effect of non-uniform illumination. The estimated illumination surface is based on the luminance values of the edge pixels of the given image that are on the dark side of text edges. In an alternative embodiment, the luminance values of the edge pixels that are on the lighter side of the detected text edges are used to generate the estimated illumination surface. The estimated illumination surface is applied to the digital image to compensate for illumination variations in the image due to non-uniform illumination. In addition to non-uniform illumination correction, the system and method enhances the mixed document images by sharpening and/or darkening edges of text contained in the images.

23 Claims, 5 Drawing Sheets

SYSTEM AND METHOD FOR ENHANCING DOCUMENT IMAGES

FIELD OF THE INVENTION

The invention relates generally to the field of image processing, and more particularly to a system and method for enhancing digital images of documents.

BACKGROUND OF THE INVENTION

When documents are digitally captured in an uncontrolled environment such as in a casual setting, the illumination on the documents will most likely be non-uniform. As a result, the digital images of these documents may have an undesirable non-uniform illumination characteristic. For example, a document that is photographed by a digital camera may result in an image with regions that are unnaturally brighter or darker than other regions of the image.

One approach to correct the non-uniform illumination problem is to convert all pixel data of a digital image into binary data. Thus, the data from each pixel will be classified into one of two states, dark and light. If the value of a pixel is less than a prescribed threshold, the pixel is assumed to be a part of the text and is designated as a dark pixel. On the other hand, if the value of a pixel is greater than the prescribed threshold, the pixel is assumed to be a part of the background and is designated as a light pixel. In this fashion, any luminance variations in the digital image caused by non-uniform illumination can be eliminated.

A concern with the binary approach is that legitimate information on the digital image may be lost during the conversion. For example, if the original document includes pictorial regions, as well as text, the lighter areas of the pictorial regions may be designated as light pixel areas and be converted into background. Another concern is that grayscale and color information of the pictorial regions are lost during the binary conversion. Therefore, the binary approach is not well suited for document images containing pictorial regions.

Another approach to correct the non-uniform illumination problem is to use a homomorphic filtering technique to enhance the digital image. Using an illumination and reflectance model, this approach takes advantage of the fact that illumination components of a digital image, unlike the reflectance components, are generally characterized by slow spatial variations. Accordingly, the homomorphic filtering approach seeks to control the illumination components of the image by manipulating the low frequency components of Fourier transforms.

However, due to the multiplicative relationship between the illumination and reflectance components, these components cannot be directly converted into the frequency domain using Fourier transformation. This problem is resolved by taking the logarithm of the illumination and reflectance components and then performing a Fourier transform operation. In the frequency domain, the Fourier components that are associated with illumination are manipulated by using a homomorphic filter function to enhance the digital image. Two inverse operations, i.e., an inverse Fourier transformation and an exponentiation, are then sequentially performed to complete the process.

A concern with the homomophic filtering approach is that pictorial content may be damaged for a digital image containing both text and smooth pictorial regions, due to the linear and spatial-invariant filtering used to operate on the illumination and reflectance components.

In view of these concerns, there is a need for a system and method to correct the effect of non-uniform illumination in digital images containing both text and pictorial content without degrading the pictorial content.

SUMMARY OF THE INVENTION

A system and method for enhancing digital images containing both text and pictorial content ("mixed document images") utilizes an estimated illumination surface of a given digital image to correct the undesirable effect of non-uniform illumination. The use of an estimated illumination surface allows the system and method to correct the effect of non-uniform illumination for mixed document images without loss of grayscale or color information, even for mixed document images containing large smooth pictorial regions. In addition to non-uniform illumination correction, the system and method enhances the mixed document images by sharpening and/or darkening edges of text contained in the images.

In an exemplary embodiment, the system in accordance with the invention includes an edge detector, a text enhancer, an illumination surface estimator, and an illumination corrector. These components may be implemented in any combination of hardware, firmware and software. In one embodiment, these components are embodied in the system as a software program that is executable by a processor of the system.

The edge detector operates to detect edges of text contained in a given digital image. The text enhancer operates to sharpen and darken the detected text edges. The illumination surface estimator operates to generate an estimated illumination surface of the digital image. The estimated illumination surface is based on the luminance values of the edge pixels that are on the dark side of the detected text edges. In an alternative embodiment, the luminance values of edge pixels that are on the lighter side of the detected text edges are used to generate the estimated illumination surface. The illumination corrector of the system operates to correct the effect of non-illumination by adjusting pixel values of the digital image using the estimated illumination surface. The illumination correction is accomplished by dividing the pixel values of the digital image by corresponding values of the estimated illumination surface.

In an exemplary embodiment, the method in accordance with the invention includes the step of receiving a digital image having a non-uniform illumination characteristic. The method also includes the step of detecting edges of text contained in the digital image and the step of enhancing the text using text edge information. The text enhancement may include sharpening and darkening the text edges. The method further includes the step of generating an estimated illumination surface of the digital image and the step of selectively adjusting pixel values of the digital image using the estimated illumination surface to correct the effect of non-uniform illumination.

Other aspects and advantages of the present invention will become apparent from the following detailed description, taken in conjunction with the accompanying drawings, illustrated by way of example of the principles of the invention.

DETAILED DESCRIPTION

Figure 1:
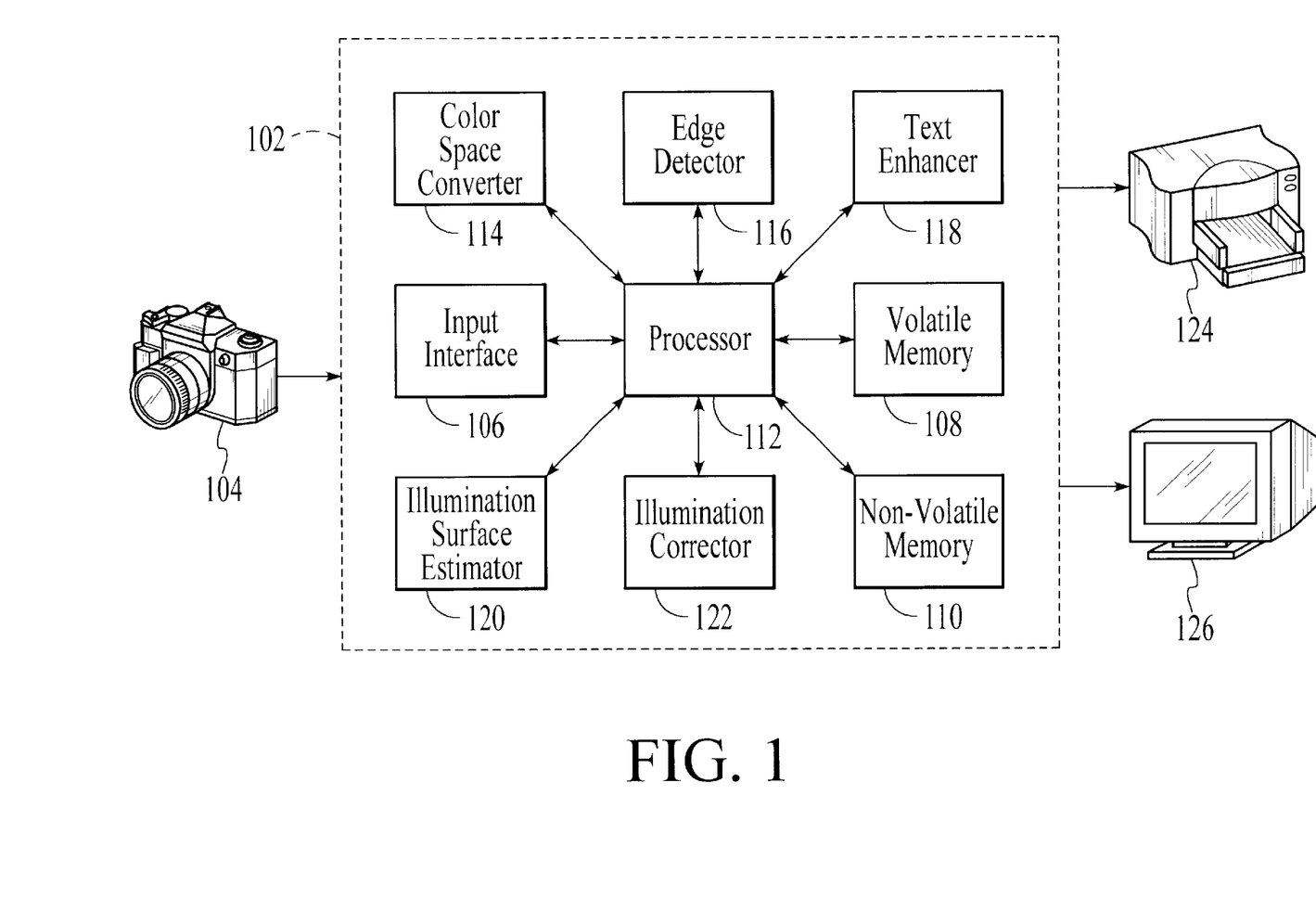
FIG. 1 is an illustration of an image enhancing system in accordance with the present invention.

With reference to FIG. 1, an image enhancing system 102 in accordance with the present invention is shown. The image enhancing system operates to enhance the quality of digital images containing both text and pictorial content by correcting the effect of non-uniform illumination. In addition, the image enhancing system enhances the text of the digital image by sharpening and darkening the text edges.

The digital images that are processed by the image enhancing system 102 may be captured using an image capturing device, such as a digital camera 104. The image quality of a digital image depends on a number of factors. Non-uniform illumination is one of the major factors that degrades the quality of a digital image acquired by a digital camera in a casual setting. Thus, by correcting the effect of non-uniform illumination, the image quality of digitally captured images can be significantly improved.

The image enhancing system 102 includes an input interface 106, a volatile memory 108 and a non-volatile memory 110 that are connected to a processor 112. These components 106–112 are computer components that are readily found in a conventional personal computer. The image enhancing system further includes a color space converter 114, an edge detector 116, a text enhancer 118, an illumination surface estimator 120, and an illumination corrector 122, which are also connected to the processor 112. Although the components 114–122 are illustrated in FIG. 1 as separate components of the image enhancing system 102, two or more of these components may be integrated, decreasing the number of components included in the image enhancing system. The components 114–122 may be implemented in any combination of hardware, firmware and software. Preferably, the components 114–122 are embodied in the image enhancing system 102 as a software program that performs the functions of the components 114–122 when executed by the processor 112.

The input interface 106 provides a means to receive digital images from an external image capturing device, such as the digital camera 104. The input interface may be a USB port, a serial port or any other interface port that is designed to interface the image capturing device to the image enhancing system 102. Alternatively, the input interface may be a drive for a standard 1.44 inch floppy disk or other portable data medium to transfer digital images from the external image capturing device to the image enhancing system 102.

The color space converter 114 of the image enhancing system 102 operates to convert an input digital image between an original color space, such as an RGB color space, and a luminance/chrominance space, such as a $YC_rC_b$ space. Although the $YC_rC_b$ space is preferred, other color spaces that include separate luminance components may be utilized. The color space conversion may be performed using a pre-calculated look-up table, which may be stored in the color space converter 114 or the non-volatile memory 110, to increase computational speed.

The edge detector 116 of the image enhancing system 102 operates to detect edges of text contained in a digital image. For each pixel of interest in the digital image, the edge detector performs edge detection by comparing the sum D1 of absolute values of adjacent luminance differences within a predefined window to a threshold value $T_e$. As an example, the predefined window may be a 5×5 pixel window.

For a pixel of interest with index (3,3), the sum D1 of absolute values of adjacent luminance differences is defined by the following equation.

$$D1 = \begin{aligned} &|Y_{22} - Y_{12}| + |Y_{32} - Y_{22}| + |Y_{42} - Y_{32}| + |Y_{52} - Y_{42}| + \\ &|Y_{23} - Y_{13}| + |Y_{33} - Y_{23}| + |Y_{43} - Y_{33}| + |Y_{53} - Y_{43}| + \\ &|Y_{24} - Y_{14}| + |Y_{34} - Y_{24}| + |Y_{44} - Y_{34}| + |Y_{54} - Y_{44}| + \\ &|Y_{22} - Y_{21}| + |Y_{23} - Y_{22}| + |Y_{24} - Y_{23}| + |Y_{25} - Y_{24}| + \\ &|Y_{32} - Y_{31}| + |Y_{33} - Y_{32}| + |Y_{34} - Y_{33}| + |Y_{35} - Y_{34}| + \\ &|Y_{42} - Y_{41}| + |Y_{43} - Y_{42}| + |Y_{44} - Y_{43}| + |Y_{45} - Y_{44}| \end{aligned}$$

Figure 2:
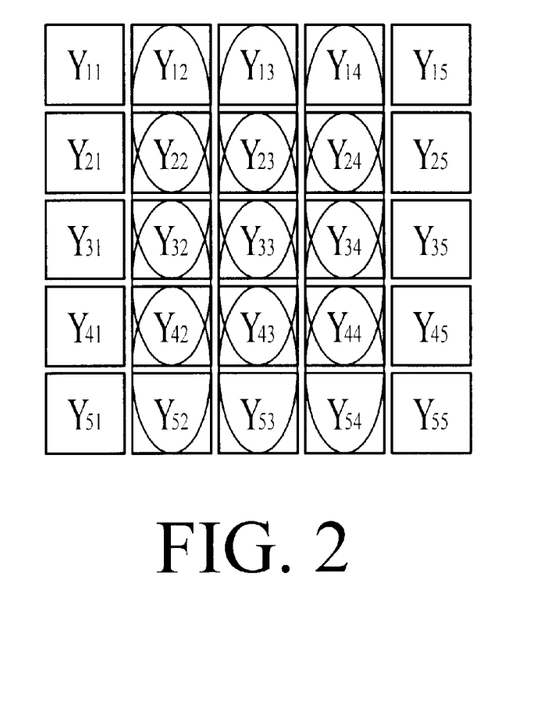
FIG. 2 is an illustration of vertical differences for the luminance channel Y that are used to detect text edges in accordance with the invention.
Figure 3:
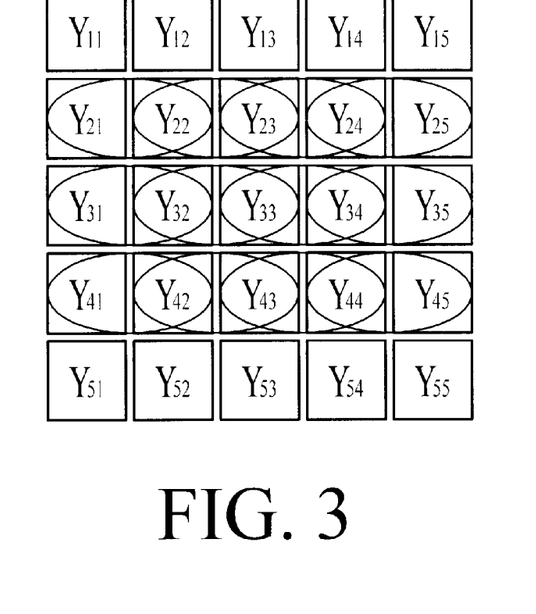
FIG. 3 is an illustration of horizontal differences for the luminance channel Y that are used to detect text edges in accordance with the invention.

The D1 value is illustrated by FIGS. 2 and 3. FIG. 2 shows the vertical differences, while FIG. 3 shows the horizontal differences.

The threshold value $T_e$ is defined by the following equation.

$$T_e = \begin{cases} T_{e,\min}, & \text{if } T_{e,\min} > \beta \cdot D1_{\max} \\ \beta \cdot D1_{\max}, & \text{otherwise} \end{cases}$$

The $D1_{max}$ value is the maximum D1 value for the entire digital image. Thus, a complete pass of the digital image along with the calculation of D1 is needed to find the maximum value $D1_{max}$. However, a partial pass such as the top quarter of the digital image may be sufficient to find an acceptable $D1_{max}$ value. The $T_{e, mim}$ value sets a minimum base to distinguish text edges from noise. The values $T_{e, min}$ and β should be empirically determined by experiments. As an example, β can be set to 0.12 and $T_{e, min}$ can be set to 60. Since the threshold $T_e$ is dependent on the maximum value $D1_{max}$ that varies from one image to another, the edge detection technique employed by the edge detector 116 is adaptive to the vast variations of digital images containing both text and pictorial content.

After the pixels belonging to text edges have been identified, the edge detector 116 operates to determine whether these pixels are located on the dark side or the bright side of the edge. That is, the edge detector determines whether the identified pixels are part of the text or whether these pixels are part of the background. The following second order derivative equation may be used to make the determination for a pixel of interest with index (3,3).

$$D2 = Y_{13} + Y_{53} + Y_{31} + Y_{35} - 4 \cdot Y_{33}$$

If D2>0, the pixel is determined to be on the dark side of the edge. Otherwise, the pixel is determined to be on the bright side of the edge.

The text enhancer 118 of the image enhancing system 102 operates to sharpen and darken the text edges using the information extracted by the edge detector 116. The text enhancer applies a known unsharp masking method to the luminance values of edge pixels to sharpen the edges. As an example, a mask based on a 3×3 window may be used to sharpen the edges. The mask is defined by the following equation.

$$Y_{33}^{out} = (K+1) \cdot Y_{33} - K \cdot (Y_{22} + Y_{23} + Y_{24} + Y_{32} + Y_{34} + Y_{42} + Y_{43} + Y_{44})/8,$$

where K is a parameter that determines the strength of the edge sharpening effect. As an example, the parameter K can be set to 2.4. Furthermore, the text enhancer applies a proportional darkening process to the pixels that have been determined to be on the dark side of the edges. Such an operation may be approximated in integer form such as the following equation to increase computational speed.

$$Y = (3 \cdot Y)/4$$

The illumination surface estimator 120 of the image enhancing system 102 operates to generates an estimated illumination surface that is based on the luminance values of edge pixels on the dark side of the edges. The estimated illumination surface is used by the illumination corrector 122 to correct the non-uniform illumination effect on the digital image.

The illumination correcting technique employed by the image enhancing system 102 in accordance to the invention is based on an illumination-reflectance model defined by the following equation.

$$P(x,y) = I(x,y) \cdot R(x,y),$$

where $P(x,y)$, $I(x,y)$ and $R(x,y)$ are pixel luminance, illumination and reflectance, respectively. Under this model, for uniform illumination, i.e., $I(x,y)$=constant, the pixel luminance $P(x,y)$ is proportional to the reflectance $R(x,y)$. However, for non-uniform illumination, i.e., $I(x,y) \neq$ constant, the pixel luminance $P(x,y)$ is dependent on two variables, i.e., the illumination $I(x,y)$ and the reflectance $R(x,y)$. Thus, if the illumination $I(x,y)$ can be estimated, then its effect can be undone, as shown by the following equations.

$$P'(x,y) = P(x,y)/\tilde{I}(x,y) = I(x,y)/\tilde{I}(x,y) \cdot R(x,y) \text{ and}$$

$$P'(x,y) \approx C \cdot R(x,y), \text{ if } I(x,y)/\tilde{I}(x,y) \approx \text{constant},$$

where $P'(x,y)$ is the resulting pixel luminance when the effect of non-uniform illumination has been corrected.

However, in general, an estimation of $I(x,y)$ from the equation $P(x,y) = I(x,y) \cdot R(x,y)$ is mathematically impossible without some assumptions. Two assumptions have been made to estimate $I(x,y)$ from the equation $P(x,y) = I(x,y) \cdot R(x,y)$. The first assumption is that all black text characters have the same reflectance (or alternatively, all white text characters or white background have the same reflectance), or as mathematically expressed, $$R(x,y)|_{(x,y) \subset \text{black char}} \propto I(x,y)|_{(x,y) \subset \text{black char}}$$

The second assumption is that $I(x,y)|_{(x,y) \subset \text{black char}}$ is sufficiently smooth to derive an estimated illumination surface $\tilde{I}(x,y)$ for the entire image by interpolating $I(x,y)|_{(x,y) \subset \text{black char}}$. In other words, the sampling points are assumed to be sufficiently dense to generate the estimated illumination surface $\tilde{I}(x,y)$.

Figure 4:
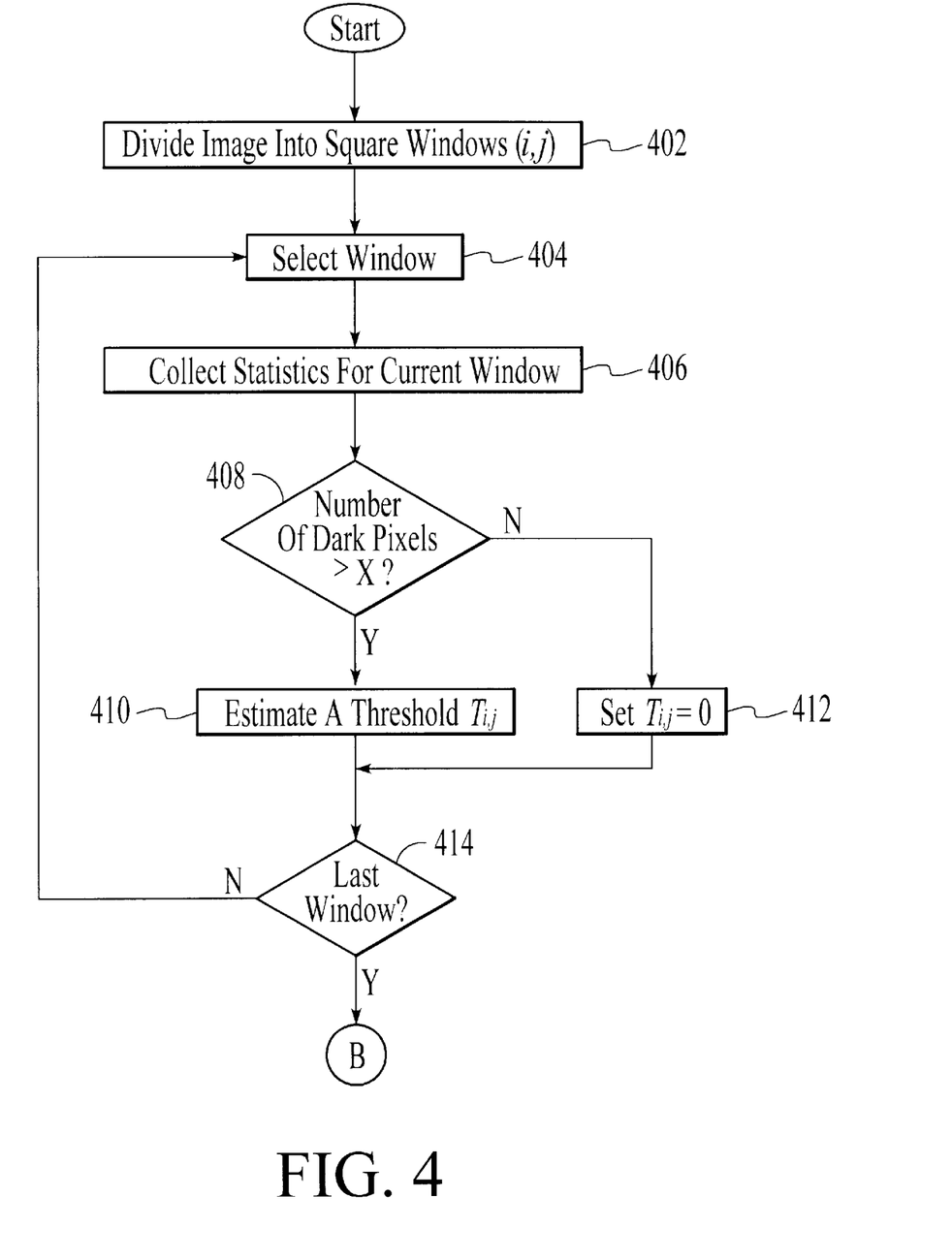
FIGS. 4 and 5 are process flow diagrams that illustrate the operation of an illumination surface estimator of the image enhancing system in accordance with the invention.
Figure 5:
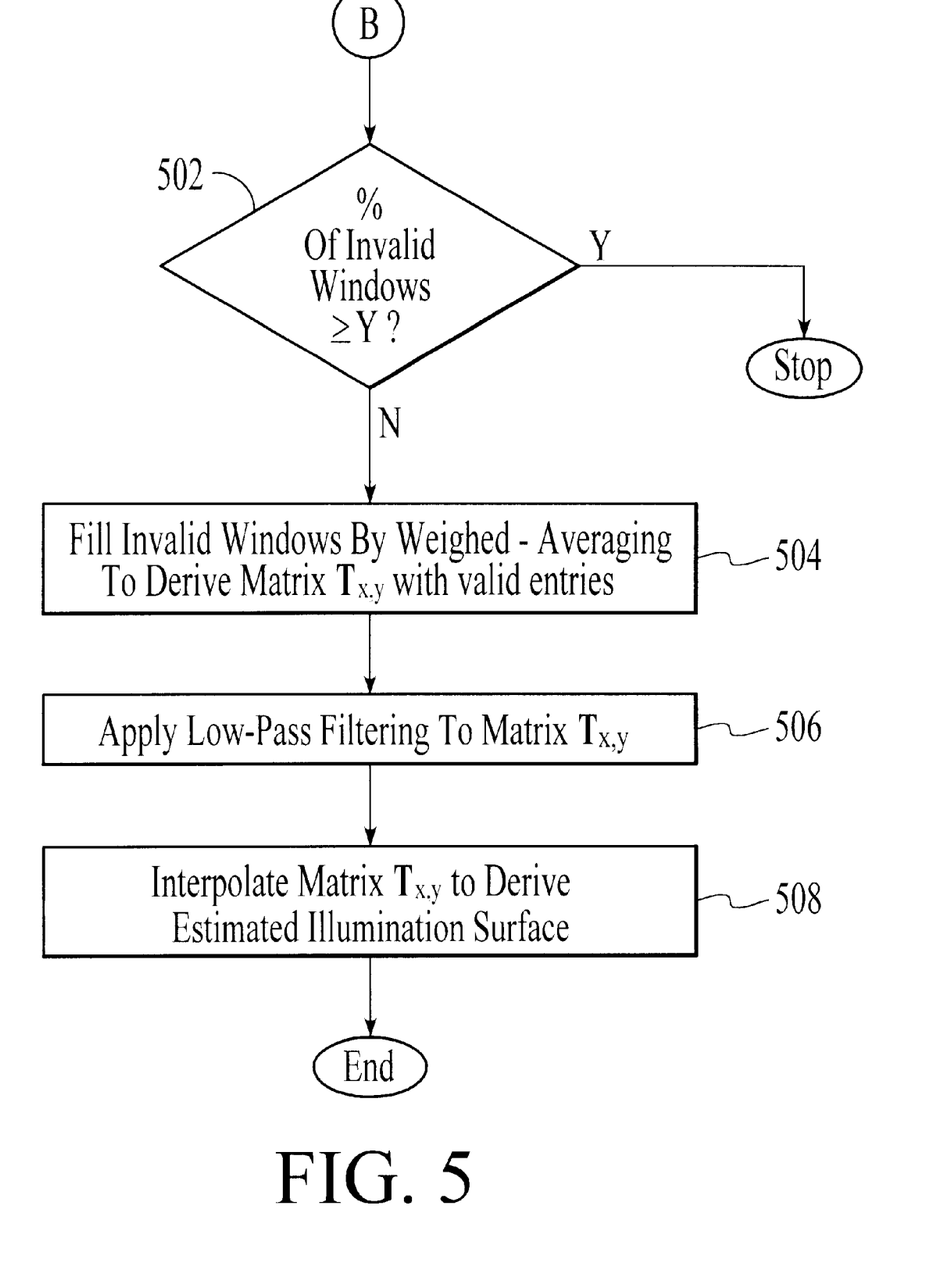

The operation of the illumination surface estimator 120 will now be described with references to FIGS. 4 and 5. As shown in FIG. 4, the digital image of interest is first divided into square windows or regions, at step 402. The origin of the image is assumed to be the square grid that is aligned with the top left corner of the image. By setting the range of the number of windows in one orientation, for example 10 to 15, the number of windows that best cover the image can be found by minimizing the size of under-covered/over-covered regions. In general, the regions in the right and bottom boundaries of the image may not be squares.

After dividing the digital image into mostly square windows, a window (i,j) is selected, at step 404. At step 406, statistics of luminance values of pixels on the dark side of edges within each window (indexed i,j) are collected. These statistics are as follows: the number of pixel $N_{i,j}$ on the dark side of edges; the maximum luminance value $V_{i,j}^{max}$; the sum of luminance values $$S_{i,j} = \sum_{m,n} V_{i,j,m,n};$$

and the sum of squared luminance values $$Q_{i,j} = \sum_{m,n} V_{i,j,m,n}^2.$$

Following the collection of the statistics for pixels on the dark side of the edges, the $N_{i,j}$ value is compared to a predefined number X (for example, 10), at step 408. If the count $N_{i,j}$ is larger than or equal to X, a threshold for each window (i,j) is estimated by the following formula, at step 410.

$$T_{i,j} = V_{i,j}^{max} - \lambda \cdot \sqrt{(Q_{i,j} - (S_{i,j}^2/N_{i,j}))/(N_{i,j}-1)},$$

where $\lambda$ is a fixed parameter empirically determined by experiments. As an example, the parameter $\lambda$ may be set to 0.7. The square root term is the estimated standard deviation of the selected edge pixels within the widow (i,j), where $S_{i,j}/S_{i,j}$ is the mean. However, if the count $N_{i,j}$ is less than the predefined number, the window (i,j) is invalidated by setting $T_{i,j} = 0$, at step 412. Next, at step 414, a determination is made whether the current widow is the last window of the image. If the current window is the last window, the process proceeds to step 502, which is illustrated in FIG. 5. However, if the current window is not the last window, the process proceeds back to step 404 to select the next window.

At step 502, a determination is made whether the percentage of invalid widows exceeds a given percentage Y (for example, 60 percent). If the percentage of invalid windows is more than Y, the process is terminated. Thus, no illumination correction is performed under this condition. However, if the percentage of invalid window does not exceed Y, the process continues to step 504. At step 504, the invalid windows are properly filled by weighted-averaging their valid neighbors iteratively, as described in the following psuedo code.

```
do {
    CHANGE = FALSE;
    make a copy of matrix T_ij as Z_ij;
    for ALL T_ij {
        if there is invalid T_ij (== 0) {
            x = 0;
            A = 0;
            for any valid 8 - nearest neighbor with offset (Δi, Δj)|_max(|Δi, Δj) = 1 {
                x = x+w_Δi,Δj T_i−Δij+Δj
                A = A + w_Δi,Δj ;
            }
            if A>0 {
                Z_ij = x/A;
                CHANGE = TRUE;
            }
        } // invalid T_ij
    } // for ALL T_ij
    if CHANGE == TRUE
        replace matrix T_ij with Z_ij;
} while CHANGE = TRUE;
```

The following central-weighted mask (or other low-pass masks) may be used as the weight mask $W_{i,j}$ for the above algorithm.

$$\begin{bmatrix} 1 & 2 & 1 \\ 2 & 4 & 2 \\ 1 & 2 & 1 \end{bmatrix}$$

The result is that the matrix $T_{i,j}$ now has all valid entries. Using a mask similar to the above central-weighted mask, a low-pass filtering is then applied to the matrix $T_{i,j}$ to further smooth it, at step 506. Lastly, the matrix $T_{i,j}$ is interpolated to derive an estimated illumination surface $\tilde{I}(x,y)$, at step 508. The interpolation step 508 includes multiplying the interpolated matrix by a constant, for example, by the constant 1.1, and then clipping the matrix at a predefined limit. The predefined limit is 255 for 256 grayscale image. As an example, the interpolation method employed by the illumination surface estimator 120 of the image enhancing system 102 may be a well-known linear interpolation method. Although steps 504, 506 and 508 have been illustrated and described as separate steps, the steps 504 and 506 can be considered as parts of the interpolation step 508. Therefore, it is possible to apply a surface fitting method directly after step 502.

Alternatively, the illumination surface estimator 120 may utilize a parametric surface fitting method to generate the estimated illumination surface $\tilde{I}(x,y)$, rather than a non-parametric method. Assuming the illumination surface can be described by a polynomial such as $S(x,y)=Ax^2+Bxy+Cy^2+Dx+Ey+F$, unknown parameters A, B, C, D, E and F need to be solved to find a polynomial that defines the estimated illumination surface of an image. For a given set of values $\tilde{S}(x,y)$, one way to determine the unknown parameters is to minimize the following mean square criteria.

$$E = \sum_i \left[ \tilde{S}(x_i, y_i) - (Ax_i^2 + Bx_iy_i + Cy_i^2 + Dx_i + Ey_i + F) \right]$$

By taking the partial derivatives of E over the parameters A, B, C, D, E and F, and equating them to zeros, a linear equation can be derived. The parameters A, B, C, D, E and F can then be obtained by solving the linear equation.

In an alternative embodiment, the illumination surface estimator 120 utilizes edge pixels that are on the lighter side of the detected edges. In this embodiment, the assumption is that the reflectance of these "light" edge pixels is constant. The process of generating the estimated illumination surface is the same as described above, except that luminance values of the light edge pixels are used instead of the dark edge pixels.

Turning back to FIG. 1, the illumination corrector 122 of the image enhancing system 102 operates to enhance a given digital image by using the estimated illumination surface $\tilde{I}(x,y)$, which was computed by the illumination surface estimator 120. The illumination corrector operates on the original color space, e.g., the RGB space.

The illumination corrector modifies the RGB components of each pixel $P_{x,y}$ of the image as follows:

if $R > \tilde{I}_{x,y}$, $R' = 255$; else $R' = 255 \cdot R / \tilde{I}_{x,y}$ if $R > \tilde{I}_{x,y}$, $R' = 255$; else $R' = 255 \cdot R / \tilde{I}_{x,y}$ if $R > \tilde{I}_{x,y}$, $R' = 255$; else $R' = 255 \cdot R / \tilde{I}_{x,y}$ The above illumination correction technique may be combined with contrast and gamma adjustment using the following equation.

$$X'_{x,y} = \begin{cases} 255, & \text{if } P_{x,y} > \tilde{I}_{x,y} \\ 255 \cdot \left[1.0 - 0.5 \cdot \left(2(\tilde{I}_{x,y} - P_{x,y})/\tilde{I}_{x,y}\right)^\alpha\right]^{1/\gamma}, & \text{else if } P_{x,y} > \tilde{I}_{x,y}/2 \\ 255 \cdot \left[0.5 \cdot (2P_{x,y}/\tilde{I}_{x,y})^\alpha\right]^{1/\gamma}, & \text{otherwise} \end{cases}$$

where $X'_{x,y}$ is an R, G or B component. In the above equation, the parameter $\alpha$ controls the contrast and the parameter $\gamma$ controls the gamma. As an example, the parameter a may be set to 1.1 and the parameter y may be set to 0.9. After the text enhancement and illumination correction, the enhanced image may be output to a printer 124 or a dispaly 126, as shown in FIG. 1.

Figure 6:
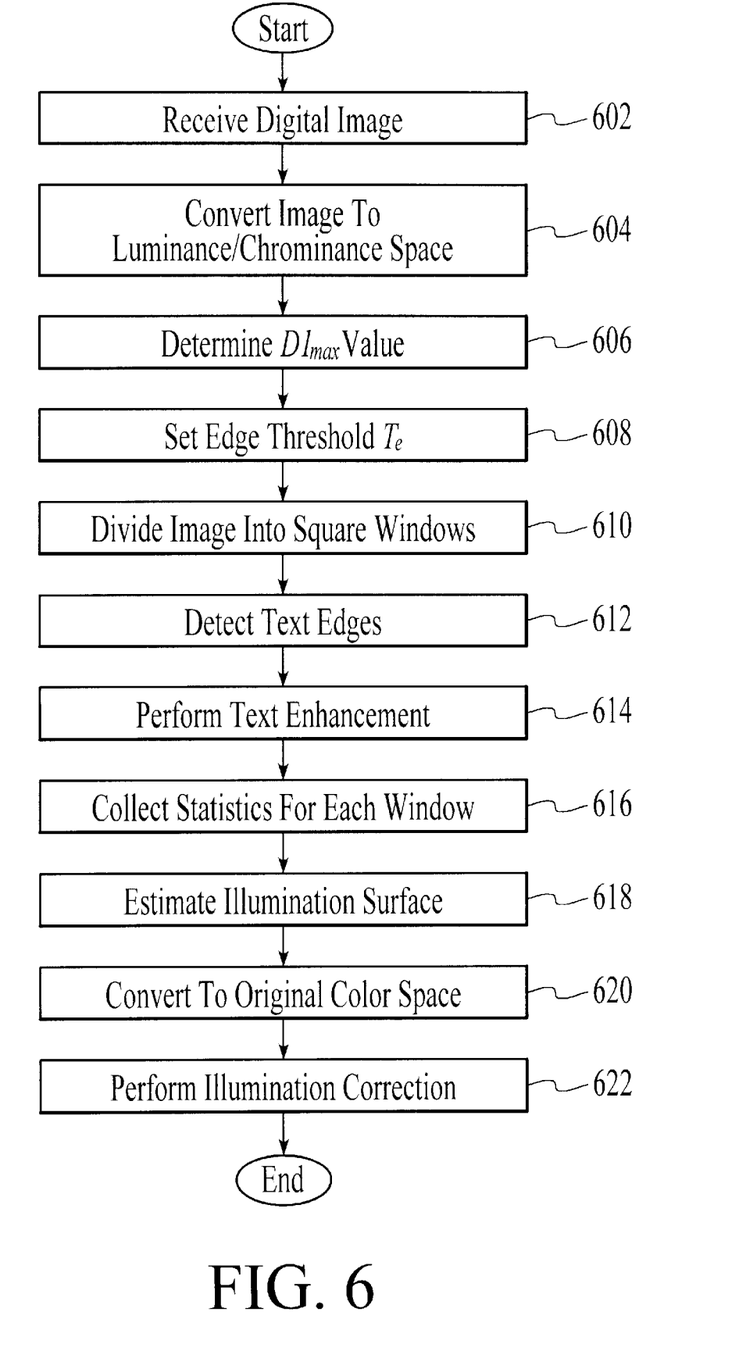
FIG. 6 is a process flow diagram of a method for enhancing a digital image in accordance with the invention.

A method of enhancing a digital image in accordance with the present invention is described with references to FIG. 6. The method is a three-pass implementation, which integrates edge enhancement and non-uniform illumination correction. At step 602, a digital image is received. The digital image may include both text and pictorial content.

During the first pass, steps 604, 606 and 608 are performed. At step 604, the image is converted from the original color space to a luminance/chrominance space. As an example, the original color space may be an RGB space, and the luminance/chrominance space may be a $YC_rC_b$ space. Using the luminance channel, the $D1_{max}$ value for the image is determined, at step 606. Next, at step 608, the threshold $T_e$ is set for edge detection.

During the second pass, steps 610, 612, 614 and 616 are performed. At step 610, the image is divided into mostly square windows. Next, at step 612, edge detection is performed using the set threshold $T_e$. At step 614, text enhancement is performed. Text enhancement may include both edge sharpening and text darkening. At step 616, statistics of luminance values of edge pixels on the dark side of edges within each window are collected. These statistics includes the following: the number of pixels $N_{i,j}$ on the dark side of edges; the maximum luminance value $V_{i,j}^{max}$; the sum of luminance values $$S_{i,j} = \sum_{m,n} V_{i,j,m,n};$$

and the sum of squared luminance values $$Q_{i,j} = \sum_{m,n} V_{i,j,m,n}^2.$$

In an alternative embodiment, statistics of luminance values of edge pixels on the lighter side of edges within each windows are collected.

During the third pass, steps 618, 620 and 622 are performed. At step 618, an illumination surface of the image is estimated. In one embodiment, the estimated illumination surface is generated using a non-parametric method, as described above in reference to FIGS. 4 and 5. In an alternative embodiment, the estimated illumination surface is generated using a parametric method. At step 620, the image is converted back into the original color space from the luminance/chrominance space. Next, at step 622, the illumination correction is then applied the digital image to correct the effect of non-uniform illumination.

The three-pass implementation is designed to use a minimum amount of RAM (random access memory) in a personal computer. However, without the constraint of RAM and number of passes, there may be other variations of the method. For example, illumination correction may be applied only to non-edge pixels combined with less edge darkening.

What is claimed is:

1. A method of enhancing a digital image comprising:
   receiving an input digital image having a non-uniform illumination characteristic, said input digital image including at least one feature;
   detecting edges of said feature of said input digital image;
   generating an estimated illumination surface of said input digital image based on selected pixel luminance values of edge pixels associated with said feature of said input digital image, including collecting statistical values of said edge pixels for each predefined section of said input digital image, said statistical values including a value selected from the group consisting of: the number of said edge pixels, the maximum luminance value for said edge pixels, the sum of luminance values of said edge pixels, and the sum of squared luminance values of said edge pixels; and
   selectively adjusting pixel values of said input digital image using said estimated illumination surface to modify said non-uniform illumination characteristic of said input digital image.

2. The method of claim 1 wherein said edge pixels are on the dark side of said edges of said feature.

3. The method of claim 1 wherein said step of generating said estimated illumination surface further includes using a threshold $T_{i,j}$ to generate said estimated illumination surface, said threshold $T_{i,j}$ being defined by $$T_{i,j} = V_{i,j}^{max} - \lambda \cdot \sqrt{(Q_{i,j} - (S_{i,j}^2/N_{i,j}))/(N_{i,j}-1)},$$

where $\lambda$ is a fixed parameter, $N_{i,j}$ is said number of said edge pixels, $V_{i,j}^{max}$ is said maximum luminance value of said edge pixels, $S_{i,j}$ is said sum of luminance values (of said edge pixels, and $Q_{i,j}$ is said sum of squared luminance values said edge pixels.

4. The method of claim 1 wherein said step of selectively adjusting said pixel values of said input digital image includes modifying said pixel values of said input digital image by factoring in said estimated illumination surface to said pixel values.

5. The method of claim 4 wherein said step of modifying said pixel values of said input digital image includes controlling the contrast or the gamma.

6. The method of claim 1 wherein said edge pixels are on the lighter side of said edges of said feature.

7. The method of claim 1 wherein said step of selectively adjusting said pixel values of said input digital image includes modifying color component values of said input digital image by factoring in said estimated illumination surface to said color component values.

8. The method of claim 1 wherein said step of generating said estimated illumination surface includes applying a parametric surface fitting technique to generate said estimated illumination surface.

9. The method of claim 1 further comprising a step of enhancing said feature of said input digital image by sharpening or darkening said edges of said feature.

10. A system for enhancing at input digital image having a non-uniform illumination characteristic comprising:
    means for detecting edges of a feature within said input digital image;
    means for generating an estimated illumination surface of said input digital image based on selected pixel luminance values of edge pixels associated with said feature of said input digital image, said generating means being configured to collect statistical values of said edge pixels for each predefined section of said input digital image, said statistical values including a value selected from the group consisting of: the number of said edge pixels, the maximum luminance value for said edge pixels, the sum of luminance values of said edge pixels, and the sum of squared luminance values of said edge pixels; and
    means for selectively adjusting pixel values of said input digital image using said estimated illumination surface to modify said non-uniform illumination characteristic of said input digital image.

11. The system of claim 1 wherein said edge pixels are on the dark side of said edges of said feature.

12. The system of claim 11 wherein said generating means is configured to generate said estimated illumination surface using a threshold $T_{i,j}$ for each predefined section of said input digital image to generate said estimated illumination surface, said threshold $T_{i,j}$ being defined by $$T_{i,j} = V_{i,j}^{max} - \lambda \cdot \sqrt{(Q_{i,j} - (S_{i,j}^2/N_{i,j}))/(N_{i,j}-1)},$$

where $\lambda$ is a fixed parameter, $N_{i,j}$ is said number of said edge pixels, $V_{i,j}^{max}$ is said maximum luminance value of said edge pixels, $S_{i,j}$ is said sum of luminance values of said edge pixels, and $Q_{i,j}$ is said sum of squared luminance values said edge pixels.

13. The system of claim 10 wherein said selectively adjusting means is configured to modify said pixel values of said input digital image by factoring in said estimated illumination surface to said pixel values.

14. The system of claim 13 wherein said selectively adjusting means is further configured to control the contrast or the gamma.

15. The system of claim 10 wherein said selectively adjusting means is configured to modify color component values of said input digital image by factoring in said estimated illumination surface to said color component values.

16. The system of claim 10 further comprising a means for enhancing said feature of said input digital image, said enhancing means being configured to perform edge sharpening or edge darkening of said feature.

17. The system of claim 10 wherein said generating means is configured to generate said estimated illumination surface using a parametric surface fitting technique.

18. A program storage medium readable by a computer, tangibly embodying a program of instructions executable by said computer to perform method steps for enhancing an input digital image having a non-uniform illumination characteristic, said method steps comprising:
    detecting edges of a feature within said input digital image;
    generating an estimated illumination surface of said input digital image based on selected pixel luminance values of edge pixels associated with said feature of said input digital image, including collecting statistical values of said edge pixels for each predefined section of said input digital image, said statistical values including a value selected from the group consisting of: the number of said edge pixel, the maximum luminance value for said edge pixels, the sum of luminance values of said edge pixels, and the sum of squared luminance values of said edge pixels; and
    selectively adjusting pixel values of said input digital image using said estimated illumination surface to modify said non-uniform illumination characteristic of said input digital image.

19. The storage medium of claim 18 wherein said edge pixels are on the dark side of said edges of said feature.

20. The storage medium of claim 19 wherein said method step of generating said estimated illumination surface further includes using a threshold $T_{i,j}$ for each predefined window of said input digital image to generate said estimated illumination surface, said threshold $T_{i,j}$ being defined by $$T_{i,j} = V_{i,j}^{max} - \lambda \cdot \sqrt{(Q_{i,j} - (S_{i,j}^2/N_{i,j}))/(N_{i,j}-1)},$$

where $\lambda$ is a fixed parameter, $N_{i,j}$ is said number of said edge pixels, $V_{i,j}^{max}$ is said maximum luminance value of said edge pixels, $S_{i,j}$ is said sum of luminance values of said edge pixels, and $Q_{i,j}$ is said sum of squared luminance values said edge pixels.

21. The storage medium of claim 18 wherein said method step of selectively adjusting said pixel values of said input digital image includes modifying said pixel values of said input digital image by factoring in said estimated illumination surface to said pixel values.

22. The storage medium of claim 18 wherein said method step of generating said estimated illumination surface includes applying a parametric surface fitting technique to generate said estimated illumination surface.

23. The storage medium of claim 18 further comprising a method step of enhancing said feature of said input digital image by sharpening or darkening said edge of said feature.

* * * * *